E. A. THOMPSON.
Wagon-Brake.
No. 163,545.  Patented May 18, 1875.
FIG I
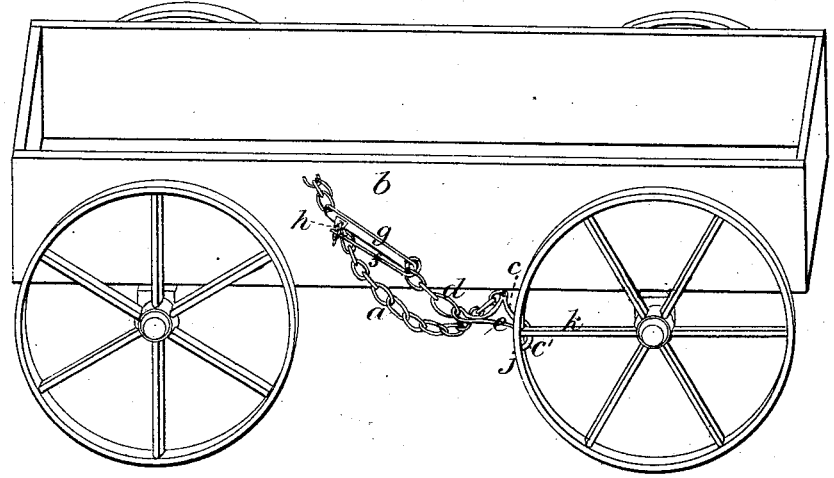
FIG II
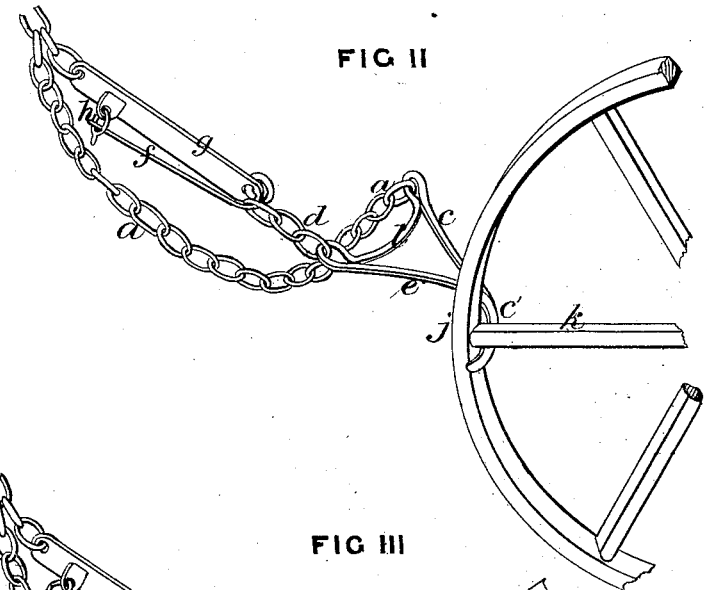
FIG III
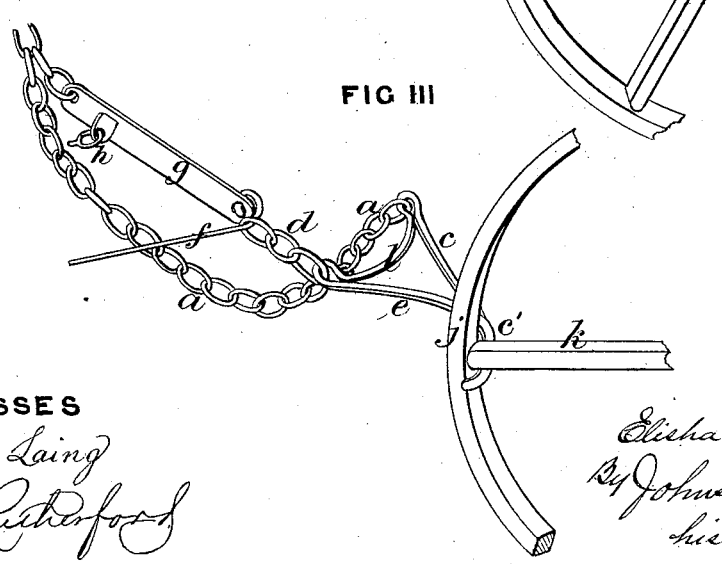
WITNESSES
John E. Laing
J. H. Rutherford
INVENTOR
Elisha A. Thompson
By Johnson and Johnson
his Attys
THE GRAPHIC CO.PHOTO-LITH.39 & 41 PARK PLACE,N.Y.

UNITED STATES PATENT OFFICE.

ELISHA A. THOMPSON, OF DALEVILLE, ALABAMA.

IMPROVEMENT IN WAGON-BRAKES.

Specification forming part of Letters Patent No. 163,545, dated May 18, 1875; application filed December 7, 1874.

*To all whom it may concern:*

Be it known that I, ELISHA A. THOMPSON, of Daleville, in the county of Dale and State of Alabama, have invented certain new and useful Improvements in Lock-Chain Hook-Brake for Wagons; and I do hereby declare that the following is a full, clear, and exact description thereof, which will enable others skilled in the art to which it pertains to make and use the same, reference being had to the accompanying drawings, and to the letters of reference marked thereon, which form a part of this specification.

My invention relates to a brake lock-chain hook for road-wagons, in which a lever-hook for locking the wheel is combined with a locking device and a swinging-trigger loop-catch in such manner that the brake-chain hook can be locked and applied to the wheel, and unlocked to release the brake, without stopping the team, being a simple chain attachment with a wheel-hook of peculiar lever form, to effect its own disengagement from the wheel when unlocked, and a trigger loop-catch, by which its chain-connection is unfastened.

In the accompanying drawings, Figure 1 represents a view in perspective of a wagon with my improved lock-chain hook applied thereto; Fig. 2, a detached enlarged view in perspective of the device with the hook locked in position for use, and Fig. 3 a view, showing the hook-chain released from the loop-catch to release the brake.

The carrying-chain $a$ is permanently fixed by one end to the side of the wagon-body $b$, and its other end is attached to one end of a double-branched hook, $c$, while the free end $d$ of the chain is secured to the other hook-branch $e$, and is of a length just sufficient to allow it to be interlocked with a locking-tongue, $f$, hinged to the lower end of a plate, $g$, the upper end of which is also permanently secured to the wagon-body. This plate $g$ carries the hinged trigger loop-catch $h$, so as to allow it to fit over and hang upon the tongue $f$, to fasten the brake-hook $c$ in position for applying the device to the wheel, which is done by putting the hook-point $c'$ on the inside of the felly $j$ from the side next the wagon, and, catching in the spoke $k$, draws the hook firm upon the wheel.

To free the wheel, the hinged-trigger loop-catch $h$ is pulled up to release the end of the tongue $f$ therefrom, and the free end $d$ of the chain will be drawn from the tongue $f$, and the hook $c'$ will be instantly pulled out from the wheel. In this detachment the inner branch $c$ of the hook forms a lever, which, by its connection with the chain $a$, disengages the hook $c'$ at once as the pull upon the hook, being transferred from the outer short chain $d$ to the inner long chain $a$, any pull upon the latter will turn the lever end $c$ out, and draw the hook in until it slips from the wheel by the simple action of the lever-hook end. The two branches of the hook may be joined by a brace, $l$, to give them greater strength.

The lever-branch $c$ curves outward from the back of the hook $c'$, and the latter is always kept in readiness for use by locking the free end $d$ of the chain with the hinged tongue, and securing the latter by the trigger loop-catch. In this way the brake or lock-chain hook can be easily applied to lock the wagon-wheels, and unlocked by simply pulling up the trigger-catch to release the tongue, when the inner hook-chain connection will pull it from the wheel, so that there is no uncertainty in releasing the chain-brake while the team is in motion, and no difficulty in applying the hook at the moment required.

I claim—

The brake lock-chain hook for wagons, consisting of the lever-hook $c\ e\ c'$, in combination with the chains $a\ d$, the locking and unlocking trigger-loop $h$, and the tongue $f$, as shown and described.

In testimony that I claim the foregoing as my own I have affixed my signature in presence of two witnesses.

ELISHA A. THOMPSON.

Witnesses:
J. J. SNELL,
R. R. HARRELL.